(12) United States Patent
Kim (10) Patent No.: US 8,746,705 B1
(45) Date of Patent: Jun. 10, 2014

(54) ACTIVE ROLL CONTROL SYSTEM

(71) Applicant: Hyundai Motor Company, Seoul (KR)

(72) Inventor: Sung-Jun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/012,235

(22) Filed: Aug. 28, 2013

(30) Foreign Application Priority Data

Dec. 31, 2012 (KR) .................. 10-2012-0158602

(51) Int. Cl.
*B60G 17/015* (2006.01)

(52) U.S. Cl.
USPC ........... 280/5.511; 280/124.149; 280/124.152

(58) Field of Classification Search
USPC ................ 280/5.507, 5.511, 5.512, 124.106, 280/124.149, 124.152
See application file for complete search history.

(56) References Cited

U.S. PATENT DOCUMENTS

| | | | |
|---|---|---|---|
| 5,839,741 A * | 11/1998 | Heyring ................. | 280/124.106 |
| 6,022,030 A * | 2/2000 | Fehring ...................... | 280/5.511 |
| 6,175,792 B1 | 1/2001 | Jones et al. | |
| 6,176,496 B1 * | 1/2001 | Busch .......................... | 280/6.157 |
| 6,517,089 B2 * | 2/2003 | Phillis et al. ............... | 280/6.157 |
| 6,851,679 B2 * | 2/2005 | Downey et al. ............ | 280/5.511 |
| 7,234,707 B2 * | 6/2007 | Green et al. ............... | 280/5.511 |
| 7,418,325 B2 * | 8/2008 | Yamada et al. ................. | 701/38 |
| 7,715,963 B2 * | 5/2010 | Yasui et al. ..................... | 701/38 |
| 8,540,251 B2 * | 9/2013 | Lee et al. ................... | 280/5.508 |
| 8,596,647 B2 * | 12/2013 | Lee et al. ................... | 280/5.508 |

FOREIGN PATENT DOCUMENTS

| | | |
|---|---|---|
| KR | 10-0521217 | 10/2005 |
| KR | 10-0629799 | 9/2006 |
| KR | 2012-0021095 A | 3/2012 |

* cited by examiner

*Primary Examiner* — Toan To
(74) *Attorney, Agent, or Firm* — Edwards Wildman Palmer LLP; Peter F. Corless (57) ABSTRACT

An active roll control system that actively controls roll by changing roll strength of a stabilizer bar by varying a connection position of a stabilizer link, which connects both ends of the stabilizer bar on a subframe with a suspension arm, on the suspension arm. The suspension arm includes a rail unit that has a top opening and includes slide rails arranged in a vehicle width direction within the rail unit, and guides a connector connected with the lower end of the stabilizer link along the slide rails. In addition, an actuator unit of the suspension arm has a driving shaft connected with the connector and provides a forward and rearward driving force to the connector.

16 Claims, 5 Drawing Sheets

FIG.1

PRIOR ART

FIG.2

PRIOR ART

ACTIVE ROLL CONTROL SYSTEM

CROSS-REFERENCE TO RELATED APPLICATION

This application claims priority to and the benefit of Korean Patent Application No. 10-2012-0158602 filed in the Korean Intellectual Property Office on Dec. 31, 2012, the entire contents of which are incorporated herein by reference.

BACKGROUND (a) Field of the Invention

The present invention relates to an active roll control system (ARCS) of a vehicle. More particularly, the present invention relates to an ARCS that can perform active roll control on a stabilizer bar with both ends mounted on a suspension arm by stabilizer links, respectively.

(b) Description of the Related Art

In general, the suspension system of a vehicle is a system that improves a vehicle riding comfort without damaging a vehicle and freight by controlling vibration or impact applied to an axle from the ground while the vehicle travels to prevent direct transmission to the vehicle body, by connecting the axle with the vehicle body.

The suspension system includes a chassis spring that attenuates impact from the ground, a shock absorber that improves vehicle riding comfort by attenuating free vibration of the chassis spring, and a stabilizer bar that suppresses rolling of a vehicle.

The stabilizer bar has both straight portions fixed to a vehicle body and both ends fixed to a lower arm or a strut bar by stabilizer links. Therefore, the stabilizer bar does not operate when left and right wheels move up/down together, but suppresses roll of a vehicle using a torsional elastic force while twisting when the left and right wheels move up/down, thereby performing an anti-roll function. In other words, the stabilizer bar maintains a stable position of a vehicle by inclining outward from a vehicle body due to a centrifugal force when the vehicle turns, or by using a torsional elastic force due to twisting when the left and right wheels have a relative phase difference due to bumping or rebounding while the vehicle travels.

However, the stabilizer bar may not ensure stability in turning under various conditions, using only the torsional elastic force because the stiffness is constant, such that an active roll control system that can perform active roll control by connecting an actuator such as a hydraulic cylinder or a motor to an end of the stabilizer has been developed and used in recent years.

The active roll control system of the related art has a mechanism that changes torsional stiffness of the stabilizer bar by varying the connection position with the actuator such as a hydraulic cylinder or a motor at the connecting portion of the stabilizer bar that connects the suspension arm and the end of the stabilizer bar to change the connection distance between the end of the stabilizer bar and the suspension arm. Further, a plurality of members are connected to the connecting portion by a ball joint to allow for free rotation within a predetermined range.

Figure 1:
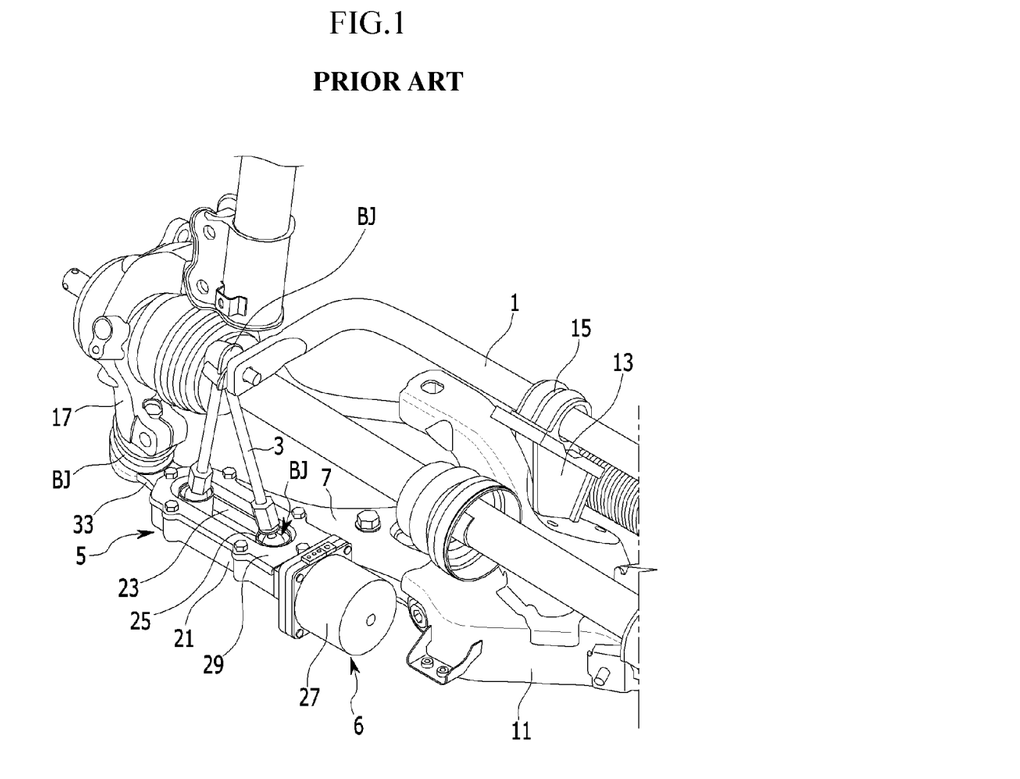
FIG. 1 is an exemplary view of a suspension system for a vehicle which is equipped with an active roll control system according to the related art.
Figure 2:
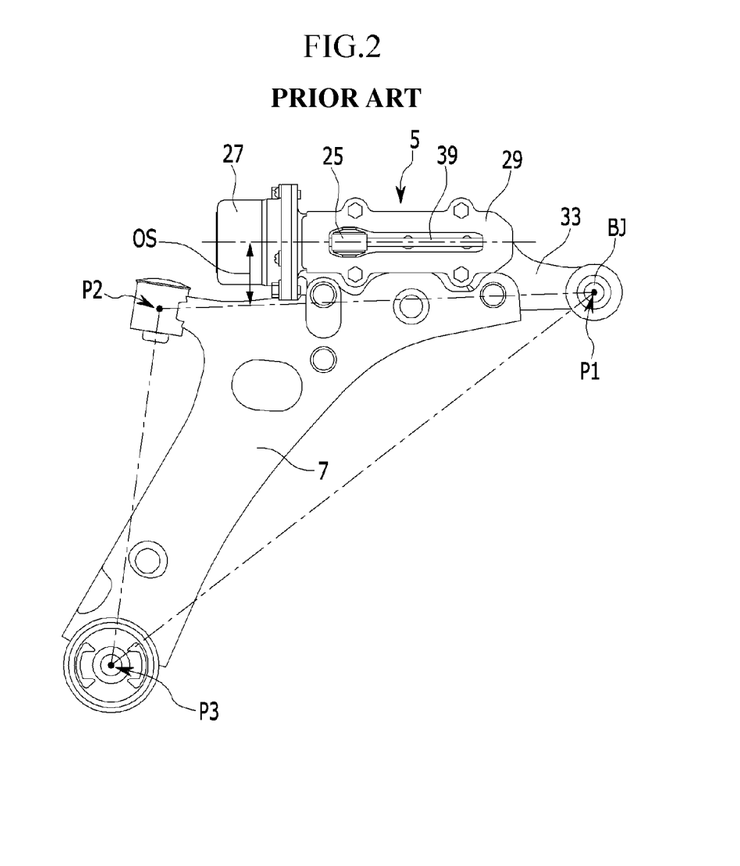
FIG. 2 is an exemplary top plan view of a lower arm with the active roll control system according to the related art.

FIG. 1 is an exemplary view of a suspension system for a vehicle equipped with an active roll control system according to the related art and FIG. 2 is an exemplary plan view of a lower arm with the active roll control system according to the related art.

Referring to FIGS. 1 and 2, an active roll control system according to the related art actively improves a roll behavior of a vehicle by changing the stiffness of a stabilizer bar 1 based on the traveling conditions of the vehicle. The active roll control system of the related art includes a stabilizer bar 1, stabilizer links 3, and a sliding unit 5 and an actuator 6 disposed on a lower arm 7, which is a suspension arm.

Both ends of the stabilizer bar 1 are disposed on a bracket 13 on a vehicle body side subframe 11 via a mounting bush 15. The upper ends of the stabilizer links 3 are connected to an end of the stabilizer 1 by a ball joint BJ. The sliding unit 5, disposed at a side of the lower arm 7 through a housing 21, is driven by a motor 27, which is the actuator 6, to move straight connectors 25 connected with the lower ends of the stabilizer links 3 in the vehicle width direction along rail plates 23 within the housing 21.

The sliding unit 5 includes the housing 21, the rail plates 23, the connectors 25, and a cover 29 while the driving source 6 is operated by the motor 27 with a lead screw 39 as a rotary shaft. In particular, the housing 21 is formed in a rectangular box shape with the top open and fastened to a side of the lower arm 7. An extender 33 is formed at an outer end of the housing 21 and connected to a side of the lower portion of a knuckle 17 by a ball joint BJ. The rail plates 23 are arranged in the vehicle width direction within the housing 21.

Furthermore, the motor 27, the driving source 6, is fastened to an inner end of the housing 21, with the screw shaft 39, which is the rotary shaft, arranged along the rail plates 23 through the inner side of the housing 21. The connectors 25 are disposed between the rail plates 23 within the housing 21 in mesh with the screw shaft 39. The connectors 25 are connected with the lower ends of the stabilizer links by a ball joint BJ. The cover 29 has a slot formed on the cross-section as large as the operation range of the connectors 25 and is fastened to the open top of the housing 21.

The active roll control system adjusts the connection positions of the stabilizer links 3 on the lower arm 7 by driving the motor 27 based on the traveling conditions of a vehicle. Accordingly, a lever ratio of the stabilizer links 3 changes and the stiffness of the stabilizer 1 correspondingly changes to actively control the roll strength of the vehicle.

As shown in FIG. 2, however, the active roll control system of the related art is offset OS in planes defined by connecting points P1, P2, and P3 on the lower arm and creates motion. However, in such a configuration, as actual bump rebound of a vehicle is implemented, the plane moves in the height direction of the vehicle and compliance influences the actual behavior due to the offset OS. In other words, in terms of the motor 27 that is the actuator 6, the stabilizer links 3 are required to move out of the behavior range of the vehicle, requiring a substantially large force. Further, when the lower arm 7 bumps or rebounds, the motion is included in the behavior range, and thus a substantially large load is applied since the lower ends of the stabilizer links 3 need to be moved in the vehicle width direction during the bump or rebound motion. In particular, the point P1 is usually within the range close the wheel center and the operation is generated out of the range, causing a decreased lateral force property.

Further, the motor 27 is disposed at the position with a substantially large influence by chipping due to vibration, foreign substance such as a stone, and on the like, potentially influencing the durability of the motor.

The above information disclosed in this section is only for enhancement of understanding of the background of the invention and therefore it may contain information that does not form the prior art that is already known in this country to a person of ordinary skill in the art.

SUMMARY

The present invention provides an active roll control system having advantages of being able to remove a push rod by integrally forming an actuator with a suspension arm allowing the suspension arm to operate as a gear housing, and to minimize compliance influence according to an actual behavior of a vehicle by allowing stabilizer links within the behavior range. Further, the present invention provides an active roll control system having advantages of being able to maintain durability of an actuator by minimizing an influence of chipping due to vibration, foreign substance such as a stone, and on the like by integrally forming an actuator with a suspension arm.

An exemplary embodiment of the present invention provides an active roll control system that actively controls roll by changing roll strength of a stabilizer bar by varying a connection position of a stabilizer link, which connects both ends of the stabilizer bar on a subframe with a suspension arm, on the suspension arm, in which the suspension arm includes: a rail unit that has a top opening and includes slide rails arranged in a vehicle width direction within the rail unit, and guides a connector connected with the lower end of the stabilizer link along the slide rails; and an actuator unit that has a driving shaft connected with the connector and provides a forward/rearward driving force to the connector. The suspension arm may be connected between the subframe of a vehicle and a knuckle. The lower arm may be connected to the knuckle and the subframe by a bush.

The actuator unit may include: a gear housing integrally formed with the rail unit of the suspension arm; a motor housing fastened to the rear of the gear housing through a motor cover; a power transmission slidably disposed in the gear housing, having a screw thread on the rear inner side, and having an end protruding outward; a screw rotary body that has a lead screw integrally connected from the rear at the center in a cylindrical rotary pipe and positioned at the center of the motor housing, in which the lead screw is thread-fastened to the screw-thread of the power transmission; and a motor disposed between the motor housing and the screw rotary body and configured to rotate the screw rotary body within the motor housing.

The gear housing may include a metal bush disposed on the front inner side and configured to reduce a friction force between the gear housing and the power transmission. The gear housing may include a sealing disposed on the inner side of the front and configured to seal the portion between the gear housing and the power transmission. The sealing may be held in place by a stop ring disposed on the front inner side of the gear housing.

The system may include a sensor unit disposed at a side between the gear housing and the power transmission and configured to detect the position of the power transmission and output a corresponding signal. The sensor unit may include: a sensing magnet disposed at a side of the power transmission; an aperture sensor disposed at a side of the center of the gear housing and configured to sense the sensing magnet and output a corresponding signal; and a sensor cover mounted on the gear housing to cover the aperture sensor.

An extension may be formed at an outer end of the motor housing and a bearing may be disposed between the front end of the rotary pipe and the motor cover and between the rear extension and the motor housing. The motor may include: a motor core disposed on the inner side of the motor housing; and a permanent magnet disposed on the outer side of the rotary pipe of the screw rotary body.

Yet another exemplary embodiment of the present invention provides an active roll control system that actively controls roll by changing roll strength of a stabilizer bar by varying a connection position of a stabilizer link, which connects both ends of the stabilizer bar on a subframe with a suspension arm, on the suspension arm. The suspension arm may include: a rail unit that has a top opening, includes slide rails arranged in a vehicle width direction, and is configured to guide a connector connected with the lower end of the stabilizer link along the slide rails; and an actuator unit having a driving shaft connected with the connector and is configured to provide a forward/rearward driving force to the connector. Further, the actuator unit may include: a gear housing disposed in parallel with the rail unit of the suspension arm; a motor housing fastened to the rear of the gear housing through a motor cover; a motor disposed within the motor housing; a power transmission slidably disposed in the gear housing and having a screw thread on the rear inner side; and a screw rotary body that includes a cylindrical rotary body selectively rotated by the motor inside the motor and a lead screw connected with the rotary pipe at the rear and thread-fastened to a screw thread of the power transmission therein.

The system may further include a sensor unit disposed at a side between the gear housing and the power transmission and configured to detect the position of the power transmission and output a corresponding signal. The sensor unit may include: a sensing magnet disposed at a side of the power transmission; an aperture sensor disposed at a side of the center of the gear housing and configured to sense the sensing magnet and output a corresponding signal; and a sensor cover mounted on the gear housing to cover the aperture sensor.

An extension may be formed at an outer end of the motor housing and a bearing may be disposed between the front end of the rotary pipe and the motor cover and between the rear extension and the motor housing. The motor may include: a motor core disposed on the inner side of the motor housing; and a permanent magnet disposed on the outer side of the rotary pipe of the screw rotary body.

According to an exemplary embodiment of the present invention, since an actuator is integrally formed with a suspension arm allowing the suspension arm to operate as a gear housing and a push rod is omitted, the entire configuration may be designed to be compact in consideration of the power transmission efficiency of the actuator where a driving force is transmitted and the operation efficiency between the stabilizer and the stabilizer link.

Further, since the stabilizer link is allowed to operate within the behavior range of the suspension arm, to reduce compliance influence based on the actual behavior of a vehicle, the roll strength may be actively maintained by varying a lever ratio of the stabilizer link, the durability of the motor may be maintained, and the stability of a vehicle in turning may be improved.

Further, since the actuator is integrally formed with the suspension arm the durability of the actuator may be maintained despite the influence caused due to chipping by vibration, foreign substance such as a stone, and the like.

| Description of symbols | | | |
|---|---|---|---|
| 100: | Actuator unit | 101: | Gear housing |
| 103: | Motor housing | 105: | Power transmission |
| 107: | Screw rotary body | 107a: | Rear extension |
| 109: | Motor | 111: | Motor cover |
| 113: | Metal bush | 115: | Sealing |
| 117: | Stop ring | 120: | Sensor unit |
| 121: | Sensing magnet | 123: | Aperture sensor |
| 125: | Sensor cover | 131: | Rotary pipe |
| 133: | Lead screw | SN: | Screw thread |
| 201: | Stabilizer bar | 203: | Stabilizer link |
| 211: | Connector | 200: | Rail unit |
| 205: | Lower arm | 209: | Slide rail |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described hereinafter in detail with reference to the accompanying drawings.

Figure 3:
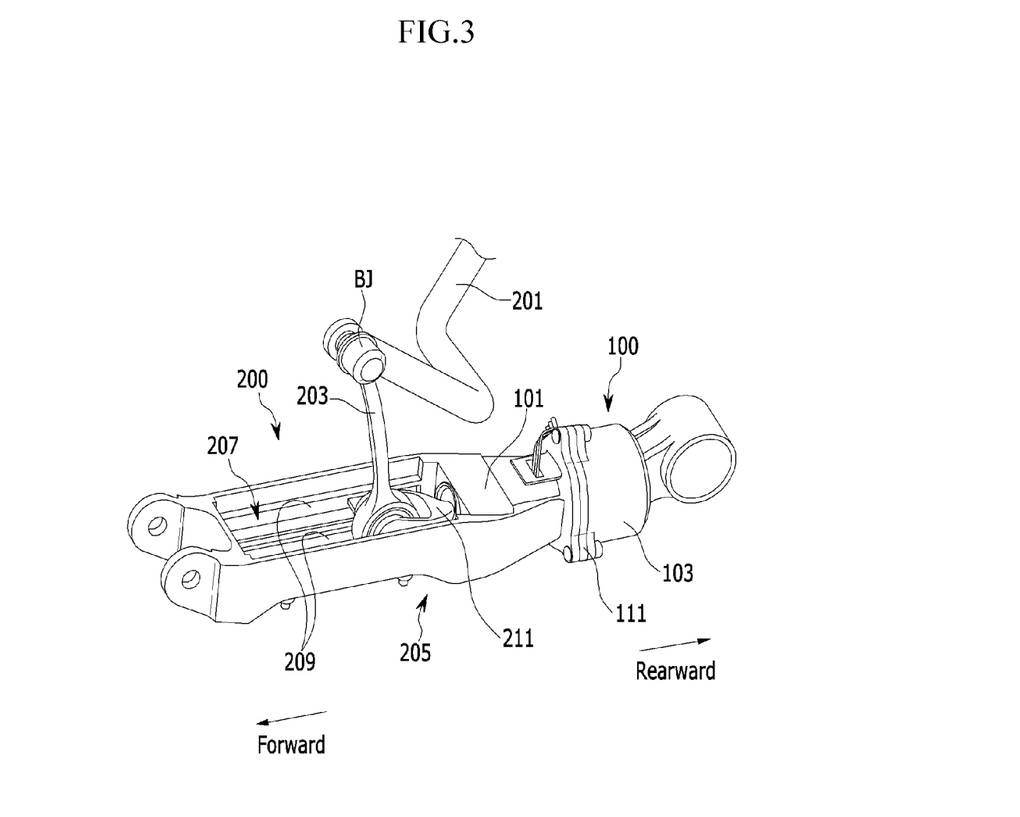
FIG. 3 is an exemplary detailed view of a suspension arm to be used for an active roll control system according to an exemplary embodiment of the present invention.

Parts that are not related to the description are not drawn to make exemplary embodiments of the present invention clear, and the left is defined as 'forward' and the right is defined as 'rearward' in FIG. 3 for the convenience of description.

Figure 4:
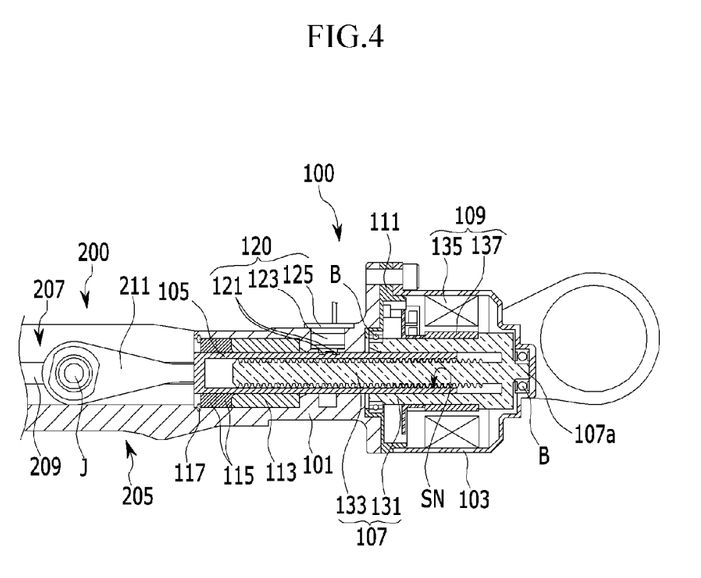
FIG. 4 is an exemplary cross-sectional view of the suspension arm to be used for an active roll control system according to an exemplary embodiment of the present invention.

FIG. 3 is an exemplary detailed view of a suspension arm to be used for an active roll control system according to an exemplary embodiment of the present invention and FIG. 4 is an exemplary cross-sectional view of the suspension arm to be used for an active roll control system according to an exemplary embodiment of the present invention. Referring to FIGS. 3 and 4, an active roll control system according to an exemplary embodiment of the present invention may actively improve a roll behavior of a vehicle by changing stiffness or roll strength of a stabilizer bar 210 based on traveling conditions of a vehicle.

The active roll control system may include a stabilizer bar 201, a stabilizer link 203, and a rail unit 200 and an actuator unit 100 which are integrally formed with a suspension arm.

A lower arm 205 connected between a subframe of a vehicle (not shown) and a knuckle (not shown) is exemplified as the suspension arm in an exemplary embodiment of the present invention for the convenience of description, but the present invention is not limited thereto. The lower arm 205 may be connected to the knuckle (not shown) and the subframe (not shown) by a bush (not shown).

The upper end of the stabilizer link 203 may be connected to an end of the stabilizer 201 by a ball joint BJ. The rail unit 200 may have an open top 207 at a side of the lower arm 205 and may include a plurality of slide rails 209 arranged in the vehicle width direction within the rail unit 200, and the slide rails 209 may be formed in the lower arm 205 to guide a connector 211 connected with the lower end of the stabilizer link 203.

The actuator unit 100 may be connected to the rear of the rail unit 200 of the lower arm 205 through a gear housing 101. The connector 211 and a power transmission 105, which is a driving shaft, may be connected to cause a forward/rearward driving force to be directly transmitted to the connector 211 without a push rod. The actuator unit 100 may include a gear housing 101 integrally formed with the rail unit 200 of the lower arm 205, a motor housing 103, the power transmission 105, a screw rotary body 107, and a motor 109.

The gear housing 101 may be arranged in parallel with the rail unit 200 of the suspension arm. In addition, a space may be formed within the gear housing 101 into which the power transmission 105 may be movably disposed. The motor housing 103 main contain the motor 109 and a motor cover 111 fastened to the rear of the gear housing 101.

The power transmission 105 may be disposed slidably forward/rearward within the space of the gear housing 101, a screw thread SN may be formed around the rear inner side of the gear housing, and the end may protrude outwardly, where spherical ball joint J for connection with the stabilizer link 203 may be formed.

A metal bush 113 may be disposed on the front inner side of the gear housing 101 and may be configured to reduce a friction force between the gear housing 101 and the power transmission 105. A sealing 115 may be disposed on the inner side of the front of the gear housing 101 to seal the portion between the gear housing 101 and the power transmission 105 and may be held together by a stop ring 117 disposed on the inner side of the front of the gear housing 101.

Furthermore, a sensor unit 120 may be disposed at one side between the gear housing 101 and the power transmission 105 and may be configured to detect the position of the power transmission 105 and output the signal to a controller (not shown).

The sensor unit 120 may include a sensing magnet 121 disposed on the outer side of a side of the power transmission 105 and an aperture sensor 123 disposed at a side at the center of the gear housing 101, and configured to sense the sensing magnet 121, and output a corresponding signal. The aperture sensor 123 may be protected by a sensor cover 125 mounted on the gear housing 101.

The screw rotary body 107 may include a cylindrical rotary pipe 131 and a lead screw 133 connected to the rear of the rotary pipe 131. The screw rotary body 107 may be positioned at the center of the motor housing 103 and the lead screw 133 may be inserted into the space of the power transmission 105 and thread-fastened to the screw-thread SN therein.

The motor 109 may be disposed between the motor housing 103 and the screw rotary body 107 within the motor housing 103 and may be configured to rotate the screw rotary body 107. In other words, the motor 109 may include a motor core 135 disposed on the inner side of the motor housing 103 and a permanent magnet 137 disposed on the outer side of the rotary pipe 131 of the screw rotary body 107. A bearing B may be disposed between the front end of the rotary pipe 131 and the motor cover 111 and between a rear extension 107a and the motor housing 103, to rotatably support the screw rotary body 107.

The active roll control system may be configured to maintain the connection positions of the stabilizer links 203 to the lower arm 205 by driving the motor 109 based on the traveling conditions of a vehicle. Accordingly, a lever ratio (e.g., distance ratio) of the stabilizer link 203 may change and the stiffness value of the stabilizer 201 may correspondingly change to actively control the roll strength of the vehicle.

Figure 5:
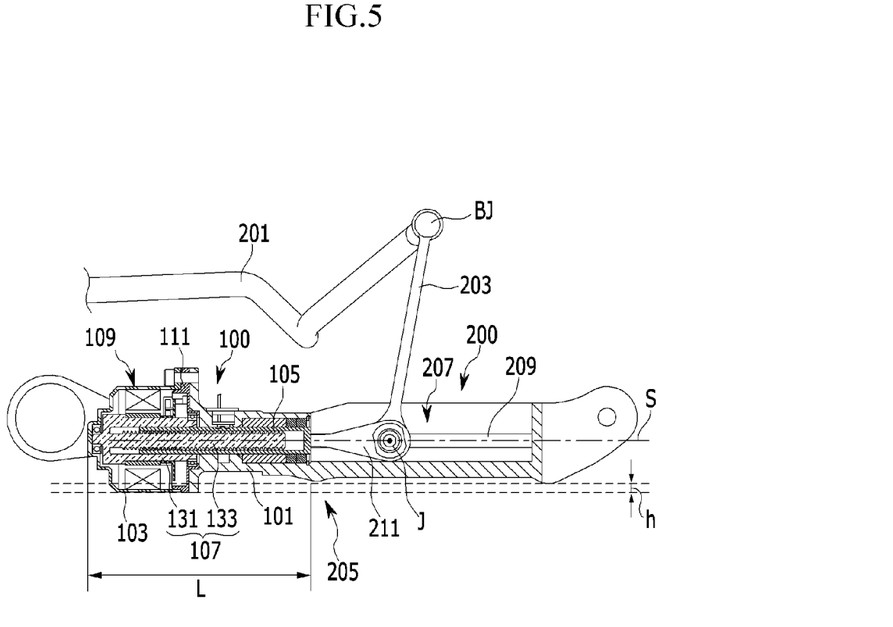
FIG. 5 is an exemplary view illustrating the operation of the suspension arm used for an active roll control system according to an exemplary embodiment of the present invention.

Referring to FIG. 5, according to the active roll control system of an exemplary embodiment of the present invention, since the power transmission 105 that is a driving shaft of the actuator unit 100 is disposed in the extension line from a sliding center line S of the connector 211, when viewed from a side, torsional torque may not be generated and the driving force of the motor 109 may be fully transmitted to the connector 211 without sticking. In other words, the driving force of the motor 109 may be transmitted to the connector 211 regardless of a behavior angle of the lower arm 205 due to bump of the vehicle body, thus, improving power transmission efficiency of the motor 109.

As the power transmission efficiency of the motor 109 is improved, it may not be necessary to increase the capacity of the motor 109. Further, as the power transmission 105 is inserted into the motor 109, the entire length L of the actuator unit 100 may be reduced, such that straightness may be easily managed, and particularly, straightness of the power transmission 105 by an external force may be ensured using the metal bush 113. In addition, since double sealing 115 is provided, waterproof and anti-vibration functions are provided, and the actuator unit 100 is integrally formed with the lower arm 205, allowing the road clearance h to be reduced.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. An active roll control system that actively controls roll by changing roll strength of a stabilizer bar by varying a connection position of a stabilizer link, which connects both ends of the stabilizer bar on a subframe with a suspension arm, on the suspension arm, the system comprising:
   a rail unit of the suspension arm having a top opening and a plurality of slide rails arranged in a vehicle width direction within the rail unit, wherein the rail unit is configured to guide a connector connected with the lower end of the stabilizer link along the slide rails; and
   an actuator unit of the suspension arm having a driving shaft connected with the connector and configured to provide a forward and rearward driving force to the connector.

2. The system of claim 1, wherein the suspension arm is a lower arm connected between the subframe of a vehicle and a knuckle.

3. The system of claim 2, wherein the lower arm is connected to the knuckle and the subframe by a bush.

4. The system of claim 1, wherein the actuator unit further includes:
   a gear housing integrally formed with the rail unit of the suspension arm;
   a motor housing fastened to the rear of the gear housing through a motor cover;
   a power transmission slidably disposed within the gear housing, having a screw thread on the rear inner side and an end that protrudes outwardly;
   a screw rotary body having a lead screw integrally connected from the rear at the center in a cylindrical rotary pipe and positioned at the center of the motor housing, in which the lead screw is thread-fastened to the screw-thread of the power transmission; and
   a motor disposed between the motor housing and the screw rotary body and configured to rotate the screw rotary body within the motor housing.

5. The system of claim 4, wherein the gear housing further includes:
   a metal bush disposed on the front inner side and configured to reduce a friction force between the gear housing and the power transmission.

6. The system of claim 4, wherein the gear housing further includes:
   a sealing disposed on the inner side of the front and configured to seal the portion between the gear housing and the power transmission.

7. The system of claim 6, wherein the sealing is held in place by a stop ring disposed on the front inner side of the gear housing.

8. The system of claim 4, further comprising:
   a sensor unit disposed at a side between the gear housing and the power transmission and configured to detect the position of the power transmission and output a corresponding signal.

9. The system of claim 8, wherein the sensor unit includes:
   a sensing magnet disposed at a side of the power transmission;
   an aperture sensor disposed at a side of the center of the gear housing and configured to sense the sensing magnet and output a corresponding signal; and
   a sensor cover mounted on the gear housing to cover the aperture sensor.

10. The system of claim 4, wherein an extension is formed at an outer end of the motor housing and a bearing is disposed between the front end of the rotary pipe and the motor cover and between the rear extension and the motor housing.

11. The system of claim 4, wherein the motor includes:
   a motor core disposed on the inner side of the motor housing; and
   a permanent magnet disposed on the outer side of the rotary pipe of the screw rotary body.

12. An active roll control system that actively controls roll by changing roll strength of a stabilizer bar by varying a connection position of a stabilizer link, which connects both ends of the stabilizer bar on a subframe with a suspension arm, on the suspension arm, the system comprising:
   a rail unit of the suspension arm having a top opening and a plurality of slide rails arranged in a vehicle width direction within the rail unit, wherein the rail unit is configured to guide a connector connected with the lower end of the stabilizer link along the slide rails; and
   an actuator unit of the suspension arm having a driving shaft connected with the connector and configured to provide a forward and rearward driving force to the connector,
   wherein the actuator unit includes:
      a gear housing disposed in parallel with the rail unit of the suspension arm;
      a motor housing fastened to the rear of the gear housing through a motor cover;

a motor disposed within the motor housing;

a power transmission slidably disposed within the gear housing and having a screw thread on the rear inner side; and a screw rotary body including a cylindrical rotary body selectively rotated by the motor inside the motor and a lead screw connected with the rotary pipe at the rear and thread-fastened to a screw thread of the power transmission therein.

13. The system of claim 12, further comprising:

a sensor unit disposed at a side between the gear housing and the power transmission and configured to detect the position of the power transmission and output a corresponding signal.

14. The system of claim 13, wherein the sensor unit includes:

a sensing magnet disposed at a side of the power transmission;

an aperture sensor disposed at a side of the center of the gear housing and configured to sense the sensing magnet and output a corresponding signal; and a sensor cover mounted on the gear housing to cover the aperture sensor.

15. The system of claim 12, wherein an extension is formed at an outer end of the motor housing and a bearing is disposed between the front end of the rotary pipe and the motor cover and between the rear extension and the motor housing.

16. The system of claim 12, wherein the motor includes:

a motor core disposed on the inner side of the motor housing; and a permanent magnet disposed on the outer side of the rotary pipe of the screw rotary body.

\* \* \* \* \*